United States Patent [19]

Herrman

[11] Patent Number: 5,581,712
[45] Date of Patent: Dec. 3, 1996

[54] METHOD AND APPARATUS FOR MANAGING LIVE INSERTION OF CPU AND I/O BOARDS INTO A COMPUTER SYSTEM

[75] Inventor: Christopher D. Herrman, Beaverton, Oreg.

[73] Assignee: Intel Corporation, Santa Clara, Calif.

[21] Appl. No.: 341,436

[22] Filed: Nov. 17, 1994

[51] Int. Cl.$^6$ .......................... G06F 13/00; H01R 9/09; H01R 13/642; H05K 7/10
[52] U.S. Cl. ............... 395/283; 395/282; 395/183.01
[58] Field of Search ...................... 395/283, 309, 395/821, 822, 823, 500, 200.01, 281, 282, 183.01; 364/480

[56] References Cited

U.S. PATENT DOCUMENTS

| | | | |
|---|---|---|---|
| 4,200,865 | 4/1980 | Morioka et al. | 340/536 |
| 4,835,737 | 5/1989 | Herrig et al. | 395/283 |
| 4,997,787 | 3/1991 | McNally et al. | 364/514 B |
| 5,134,617 | 7/1992 | McRoy | 371/29.1 |
| 5,210,855 | 5/1993 | Bartol | 395/500 |
| 5,247,619 | 9/1993 | Mutoh et al. | 395/283 |
| 5,310,998 | 5/1994 | Okuno | 235/380 |
| 5,317,697 | 5/1994 | Husak et al. | 395/283 |

OTHER PUBLICATIONS

Finger, Roger, Multibus II Live Insertion of Boards Draft PSB Addendum, Sep. 5, 1991, Multibus Manufacturers Group.

*Primary Examiner*—Gopal C. Ray
*Attorney, Agent, or Firm*—Blakely, Sokoloff, Taylor & Zafman

[57] ABSTRACT

Circuitry and logic are provided to a bus control module of a system bus of a computer system to inject the bus control module into, and win a system test master arbitration process initiated by a live inserted and successfully self tested CPU or I/O board. However, upon winning the system test master arbitration, the bus control module will inform the live inserted CPU or I/O board that it is not interested in having the CPU or I/O board in participating in system wide testing. In fact, the bus control module will not even initiate any system wide testing. As a result, CPU or I/O boards equipped with circuitry and logic to support certain required power on/reset testing protocol may be live inserted into the system without modifications, and without interruption to system operation.

12 Claims, 7 Drawing Sheets

METHOD AND APPARATUS FOR MANAGING LIVE INSERTION OF CPU AND I/O BOARDS INTO A COMPUTER SYSTEM

BACKGROUND OF THE INVENTION

1. Field of the Invention

The present invention relates to the field of computer systems. In particular, the present invention relates to live insertion of CPU and input/output (I/O) boards into a computer system.

2. Background Information

Increasing number of powerful server computer systems are now being offered in the market place by a number of vendors. More and more of these server computer systems are being used and depended upon to support complex and/or critical business applications. As dependency increases, expectation of uninterrupted availability of these systems by their purchasers also follows. As a result, a number of live insertion technologies has emerged to allow these systems to be field repaired or upgraded without interrupting their availability.

To ensure compatibility or interchangeability of parts, many of these server computer systems adhere to various industry standards. For example, the processor(s), memory subsystems and I/O subsystems are typically built around an industry bus standard, such as Multibus II. Thus, at least in some aspects, if not in totality, the live insertion technologies are bus standard specific.

Figure 1:
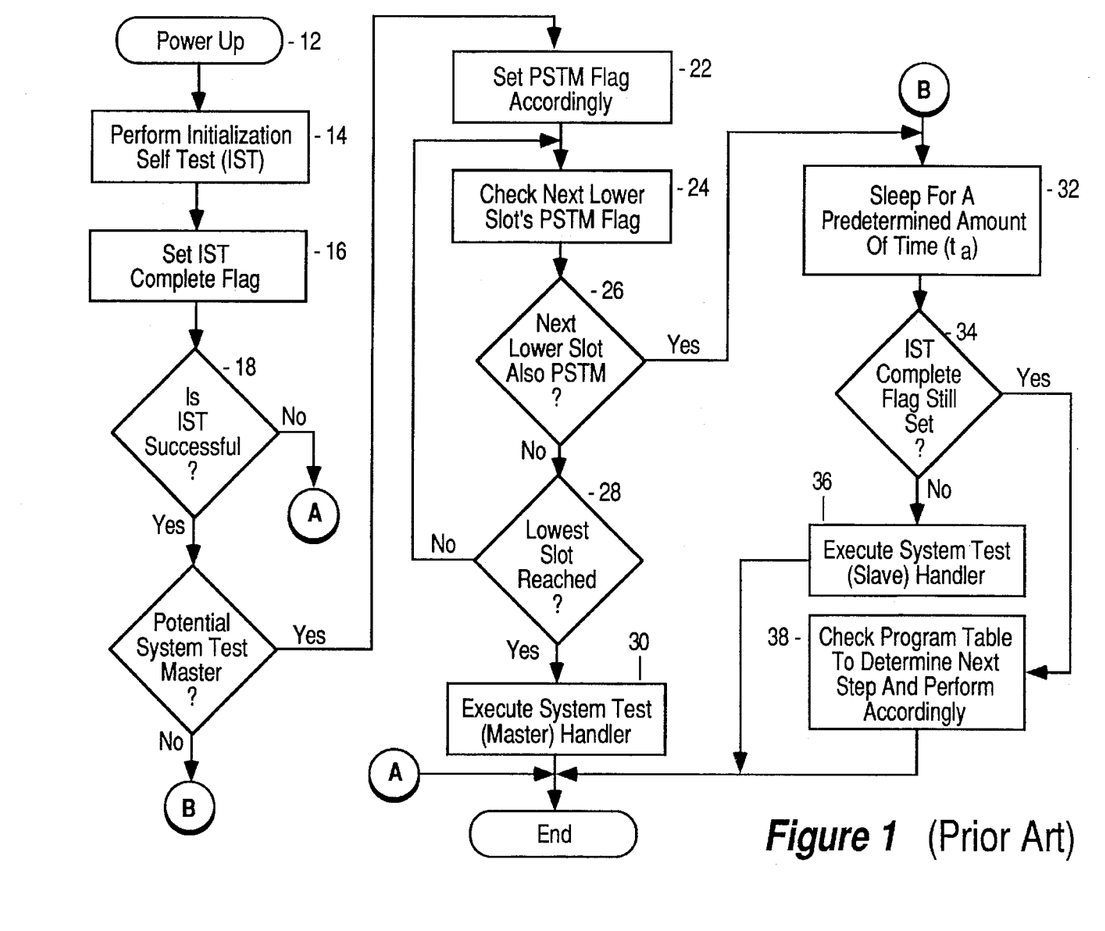
FIG. 1 illustrates a typical prior art power on/reset testing protocol required of CPU or I/O boards.

Taking Multibus II as an example again, among other things, each CPU or I/O board is required to perform and support certain testing protocol at power on or reset. FIG. 1 illustrates this prior art power on/reset testing protocol. As shown, at power on/reset, the CPU or I/O board is required to perform initialization self test (IST), step 14. At the end of IST, the CPU or I/O board is required to set an IST complete flag to denote test complete, step 16. Next, the CPU or I/O board determines if it passed the self test, step 18. If the CPU or I/O board failed the self test, it takes no further action. On the other hand if the CPU or I/O board passed the self test, the CPU or I/O board is required to determine if it is a potential system test master, step 20.

If the CPU or I/O board is a potential system test master, the CPU or I/O board is further required to set a potential system test master (PSTM) flag to denote such potential accordingly, step 22. Then, the CPU or I/O board is required, upon setting the PSTM flag, to iteratively check whether another CPU or I/O board at a lower slot also has indicated it is a potential system test master, steps 24–28. If the result of the checking is negative, the CPU or I/O board won the system test master arbitration, and is required to act as the system test master, step 30. Under the Multibus II standard, the system test master is required to clear the IST completion flag of each CPU or I/O board that it wants to participate in the system test.

However, if it is determined at step 20 that the CPU or I/O board is not a potential system test master, or at step 26 that there is a CPU or I/O board at a lower slot also having indicated it is a potential system test master, the CPU or I/O board is required to "sleep" for a predetermined amount of time, step 32, typically sufficiently long to ensure the test master arbitration process to complete. Then, the CPU or I/O board is required, upon sleeping for the predetermined amount of time, to check if its IST complete flag is still set, step 34. If the IST complete flag is still set, the CPU or I/O board is required to check its own program table and act accordingly in an application dependent manner, step 38. Otherwise, the CPU or I/O board is required to participate in the system test as a slave device, step 36.

Since each CPU or I/O board is required to support the power on/reset testing protocol, if one of these CPU or I/O boards is inserted live, it will attempt to go through the protocol when it is given power. Since other CPU or I/O boards in the system would have gone beyond the testing stage and functioning in a normal operating mode, the live inserted CPU or I/O board would win the system test master arbitration. The live inserted CPU or I/O board would then attempt to cause system testing to be performed, potentially causing unpredictable results to the system.

Various hardware and/or software approaches have been considered by the industry to resolve this problem. However, all the hardware and/or software approaches known to the inventors all have one common disadvantage in that it requires modification to and/or additional support by the CPU or I/O boards. Since there are literally hundreds if not thousands of CPU or I/O board products in the industry, any solution requiring modification to and/or additional support by the CPU or I/O boards is less than desirable.

As will be disclosed in more detail below, the present invention provides for a method and apparatus for managing the above described power on/reset protocol, without requiring any changes to or additional support by CPU or I/O boards.

SUMMARY OF THE INVENTION

The desired results are advantageously achieved by providing circuitry and logic to a bus control module of a system bus of a computer system that injects the bus control module into, and wins the system test master arbitration process initiated by a live inserted and successfully self tested CPU or I/O board. However, upon winning the system test master arbitration, the bus control module gives the live inserted CPU or I/O board the impression that it is not to participate in system wide testing. Furthermore, the bus control module will not even initiate any system wide testing. As a result, CPU or I/O boards equipped with circuitry and logic to support the required power on/reset testing protocol may be live inserted into the system without modifications, and without interruption to system operation.

More specifically, the bus control module is provided with a like PSTM flag, when set, denoting to a live inserted CPU or I/O board that the bus control module is a potential system test master. The bus control module is further provided with circuitry and complementary logic that guaranties the PSTM flag is so set, if and when a live inserted CPU or I/O board arbitrates to be system test master, upon having been provided with power. Additionally, the bus control module is provided with circuitry and complementary logic for detecting live insertion of a CPU or I/O board, temporarily suspending bus operations, allowing power to be applied to the live inserted CPU or I/O board, and resuming the suspended bus operations after letting an appropriate amount of time to elapse, to allow the bus to reach a quiescent state.

The set state of the PSTM flag at the time a live inserted CPU or I/O board arbitrates to be system test master may be guaranteed by having the PSTM flag set whenever a live insertion is detected, and reset after system test master arbitration is completed. Alternatively, the set state of the PSTM flag at the time a live inserted CPU or I/O board arbitrates to be system test master may be guaranteed by setting the PSTM flag after power on/reset initialization, and leaving the PSTM flag remain set throughout operation. In yet another alternative, the set state of the PSTM flag at the time a live inserted CPU or I/O board arbitrates for system test master may be guaranteed by having the bus control module supports the prior art power on/reset testing protocol, arbitrating to be system test master, and leaving the PSTM flag set throughout operation after the system wide test is completed.

In one embodiment, the PSTM flag is implemented as part of a data interface of the bus control module, the detection of live insertion is implemented with detection circuitry of the bus control module, and the allowance of power application is implemented with power control circuitry of the bus control module. The setting of the PSTM flag, the suspension and resumption of bus operations, etc. are implemented with logic provided to a micro-controller of the bus control module.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 2:
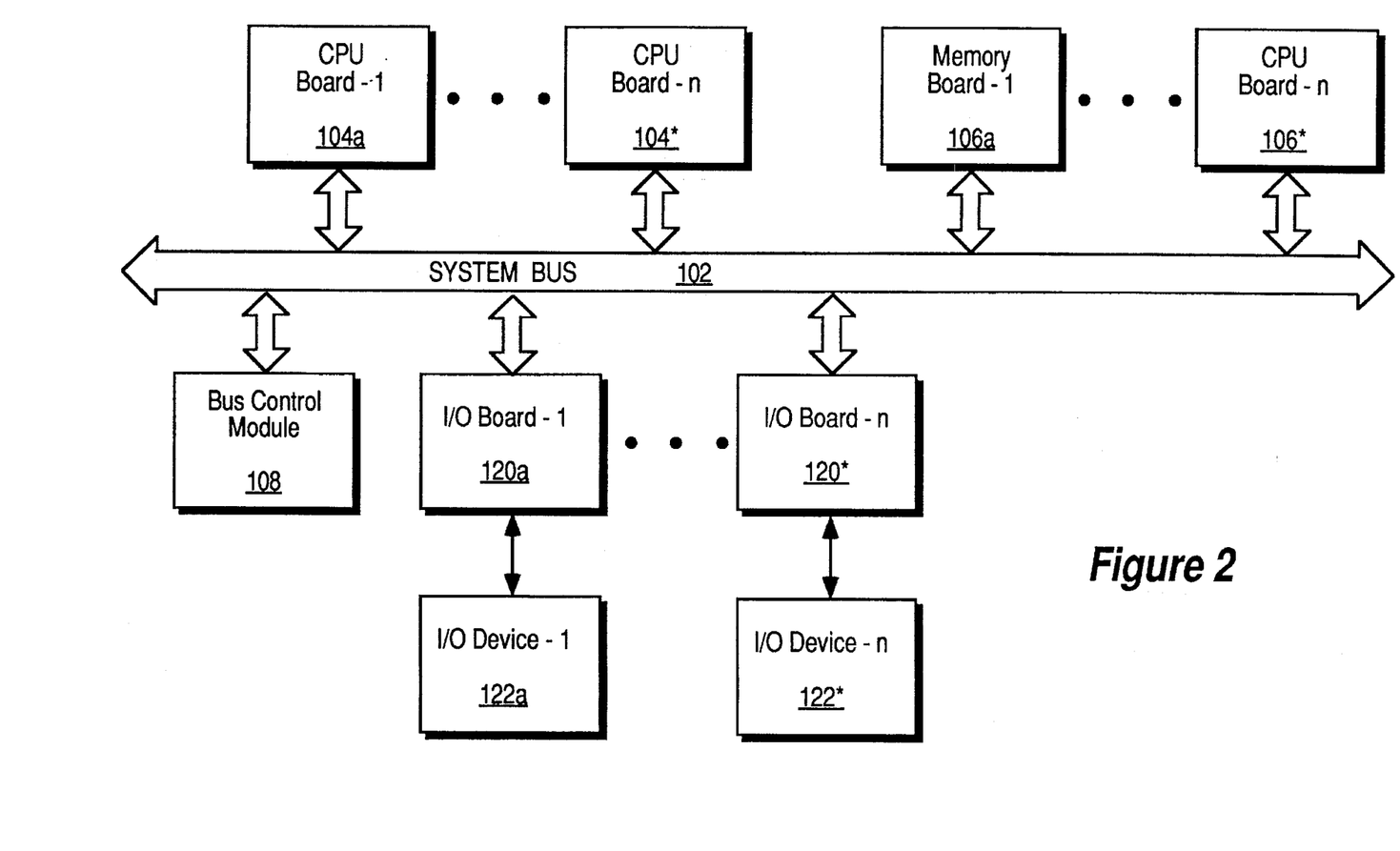
FIG. 2 illustrates an exemplary computer system incorporated with teachings of the present invention.

Referring now to FIG. 2, a block diagram illustrating an exemplary computer system incorporating the teachings of the present invention is shown. Exemplary computer system 100 comprises one or more CPU boards 104a–104*, each having one or more processors, one or more memory boards 106–106*, each having a number of memory modules, and system bus 102 interconnected to each other as shown. Exemplary computer system 100 further comprises a bus control module 108 incorporated with the teachings of the present invention, and a number of I/O boards 120a–120*, each having an I/O device 122a–122* correspondingly connected to it, coupled to the system bus 102 as shown. The CPU, memory, and I/O boards 104a–104*, 106a–106*, and 120a–120* are interconnected to the system bus 102 via a number of bus connector slots (124a–124* of FIG. 2), which will be described in more detail below.

Except for the teachings incorporated in bus control module 108, CPU and I/O boards 104a–104* and 120a–120* are intended to represent those CPU and I/O boards that support power on/reset testing protocols similar to the protocol illustrated in FIG. 1, all other elements 102, 106 and 122a–122* of exemplary computer systems 100 are intended to represent a broad category of similar elements found in many computer systems. Their constitutions and functions are well known, thus will not be further described. As will be obvious from the descriptions to follow, because of the teachings of the present invention incorporated in bus control module 108, CPU or I/O boards 104a–104* and 120a–120* may be live inserted while exemplary computer system 100 is in operation, without any modifications to the CPU or I/O boards 104a–104* and 120a*–120*. Bus control module 108 will be described in more detail below with additional references to the remaining figures.

Figure 3:
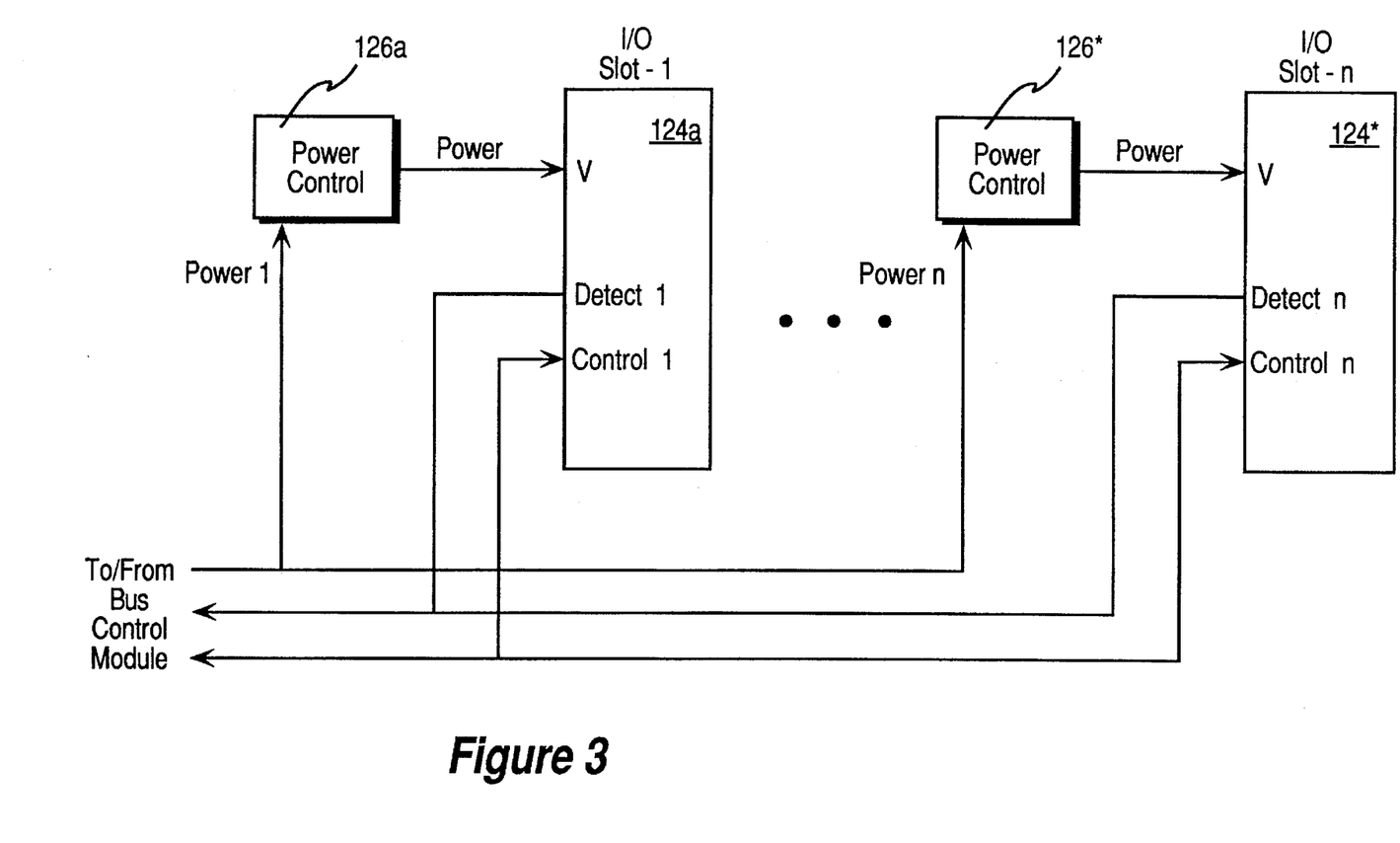
FIG. 3 illustrates one embodiment of the CPU or I/O board connector slots of the system bus of FIG. 2.

FIG. 3 illustrates one embodiment of the bus connector slots 124a–124* of system bus 102. As shown, system bus 102 includes bus connector slot 1 through n 124a–124* for connecting a number of CPU, memory and I/O boards 104a–104*, 106a–106* and 120a–120* to the system bus 102, one bus connector slot 124a–124* for each CPU, memory or I/O board 104a–104*, 106a–106* and 120a–120*. By convention, bus control module 108 occupies bus connector slot 0 (not illustrated). Each bus connector slot 124a–124* is provided with its own corresponding power control circuitry 126a–126* for controlling power application to the bus connector slot 124a–124*, thereby controlling power application to the connecting CPU, memory or I/O board 104a–104*, 106a–106 and 120a–120*. Power control circuitry 126–126* are in turn controlled by bus control module 108.

Additionally, each bus connector slot 124a–124* includes at least one pin (DETECT1-DETECTn) for providing a detection signal to bus control module 108 when a CPU, memory or I/O board 104a 104*, 106a–106* and 120a–120* is actually inserted in the bus connector slot 124a–124*. Each bus connector slot 124a–124* also includes a number of pins (CTRL1–CTRLn) for receiving control signals from bus control module 108 for the connected CPU, memory or I/O board 104a–104*, 106a–106* and 120a–120*.

Figure 4:
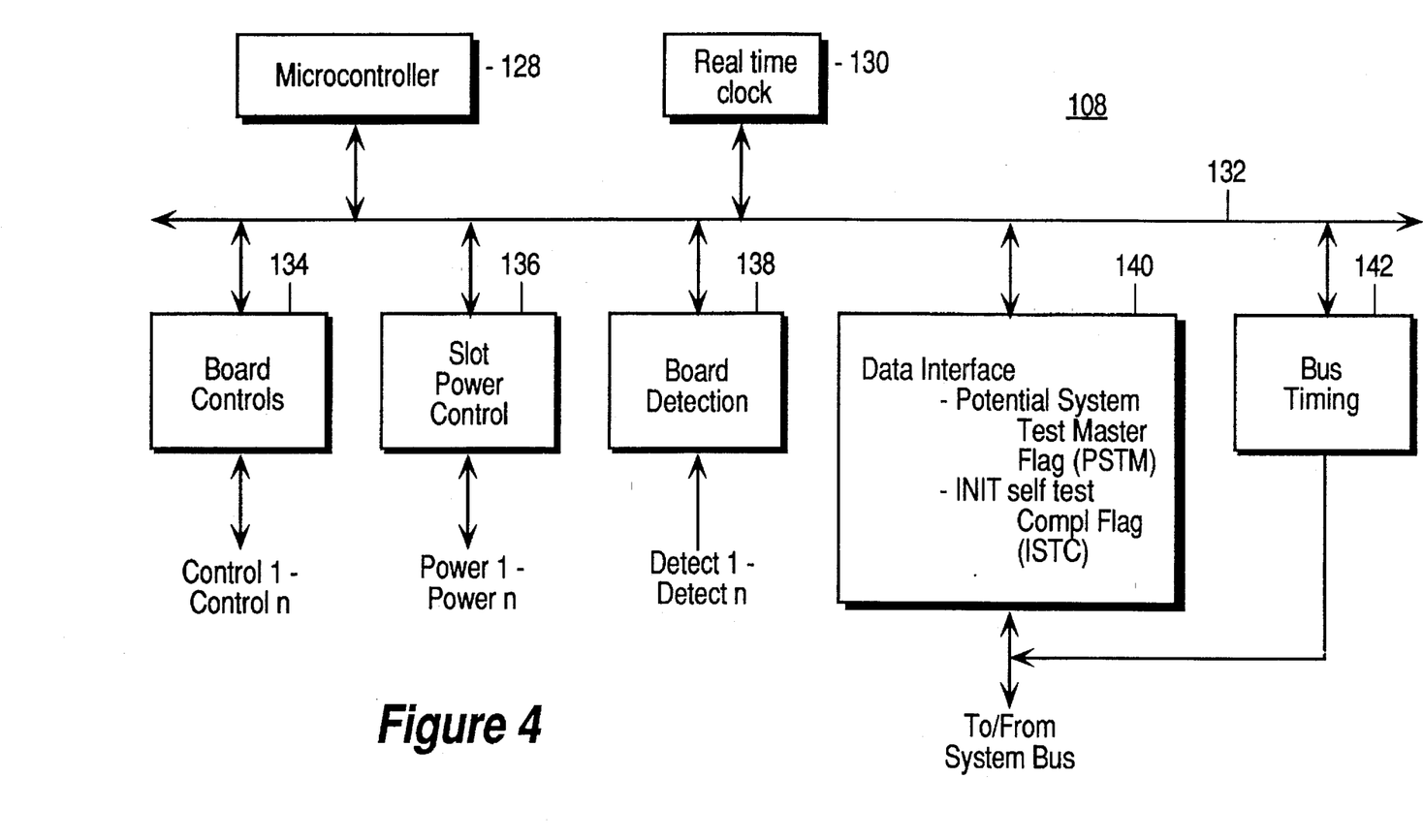
FIG. 4 illustrates one embodiment of the bus control module of FIG. 2.

FIG. 4 illustrates one embodiment of bus control module 108. As shown, bus control module 108 includes micro-controller 128, real time clock 130, internal bus 132, board control circuitry 134, bus connector slot power control circuitry 136, board detection circuitry 138, data interface 140, and bus timing circuitry 142 interconnected to each other as illustrated. Data interface 140 facilitates commands as well as control and status exchanges between bus control module 108 and the rest of the system 100. In particular, in accordance to the teachings of the present invention, data interface 140 is provided with a flag, when set, denoting bus control module 108 is a potential system test master (PSTM). As will be described in more detail below, PSTM flag is designed to be in a set state, if and when a live inserted CPU or I/O board 104a–104* and 120a–120* arbitrates to be system test master, to inject the bus control module 108 into, and win the system test master arbitration. Bus control module 108 will always win the system test master arbitration by virtue of the fact that it occupies bus connector slot 0, and a live inserted CPU or I/O board 104a–104* and 120a–120* occupying a higher ordered bus connector slot 124a–124* will give up arbitration to be system test master, as described earlier.

Micro-controller 128 controls operation of bus control module 108. implementing the method steps of the present invention. In particular, micro-controller 128 ensures the PSTM flag of bus control module 108 will be in the set state whenever a live inserted CPU or I/O board 104a–104* and 120a–120* arbitrates to be system test master. Additionally, upon winning the system test master arbitration, micro-controller 128 leaves the IST complete flag of the live inserted CPU or I/O board 104*a*–104* and 120*a*–120* in the set state, giving the CPU or I/O board 104*a*–104* and 120*a*–120* the impression that it's participation in system wide testing is not desired by the winning system test master. However, the micro-controller 128 does not initiate nor master any system wide test.

Board detection circuitry 138 detects for detection signals DETECT1-DETECTn from bus connector slots 1-n 124*a*–124*n* under the control of micro-controller 128. Similarly, board control circuitry 134 and bus connector slot power control circuitry 136 generate control signals CTRL1-CTRLn and power control signals PWR1-PWRn for CPU, memory or I/O boards 104*a*–104*, 106*a*–106* and 120*a*–120*, and bus connector slots 1-n 124*a*–124*n* respectively, under the control of micro-controller 128. Real time clock 130 and bus timing circuitry 142 perform their conventional functions well known in the art.

Except for the method steps of the present invention provided to micro-controller 128 and the PSTM flag provided to data interface 140, these elements 128–142 are intended to represent a broad category of similar elements found in many bus control modules. Their constitutions and functions are also well known, and therefore will not be further described.

Figure 5A:
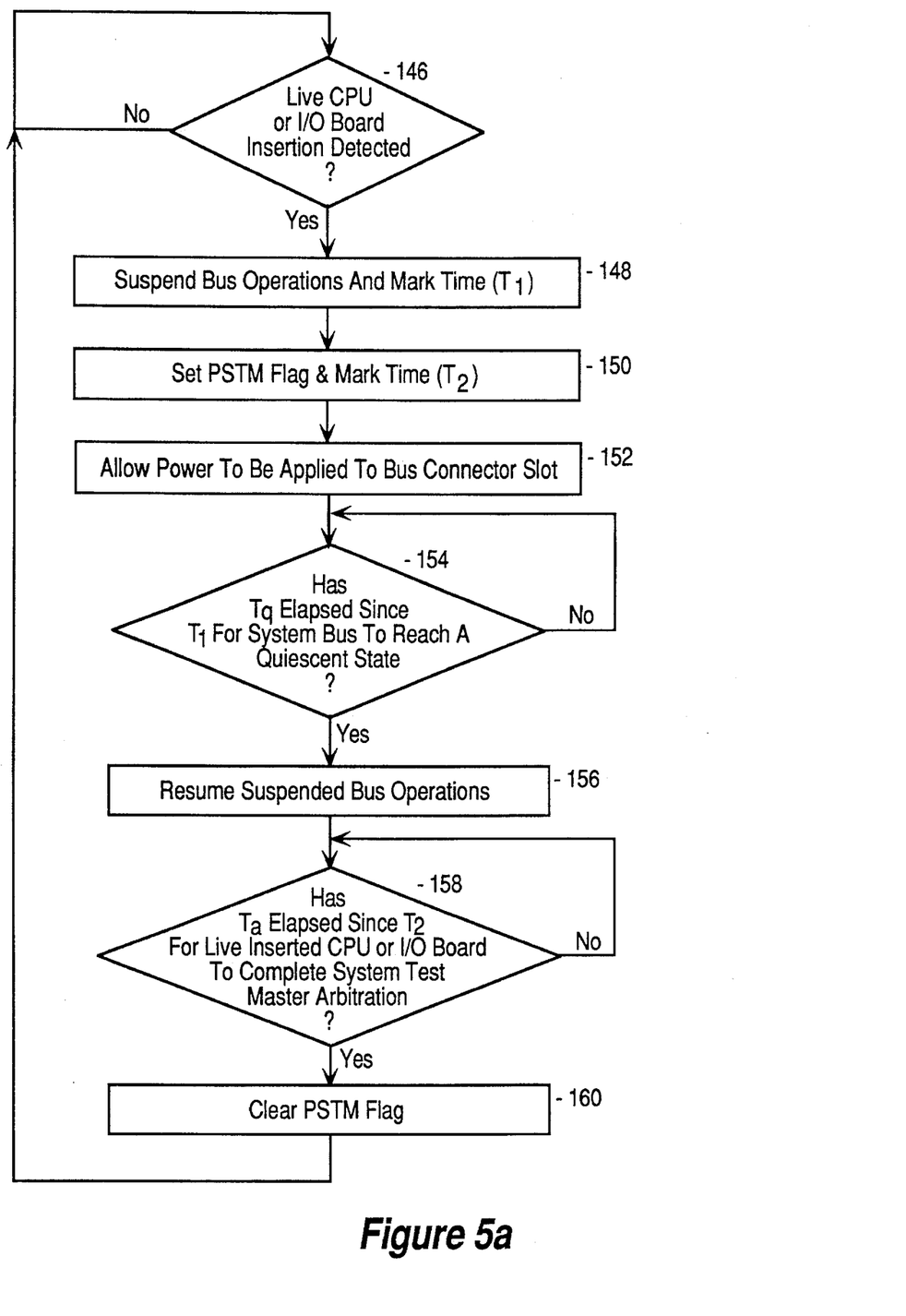
FIG. 5a–5c illustrate three embodiments of the method steps of the present invention implemented by the micro-controller of FIG. 4, including steps for ensuring the PSTM flag is in the set state, if and when a live inserted CPU or I/O board arbitrates to be system test master.
Figure 5B:
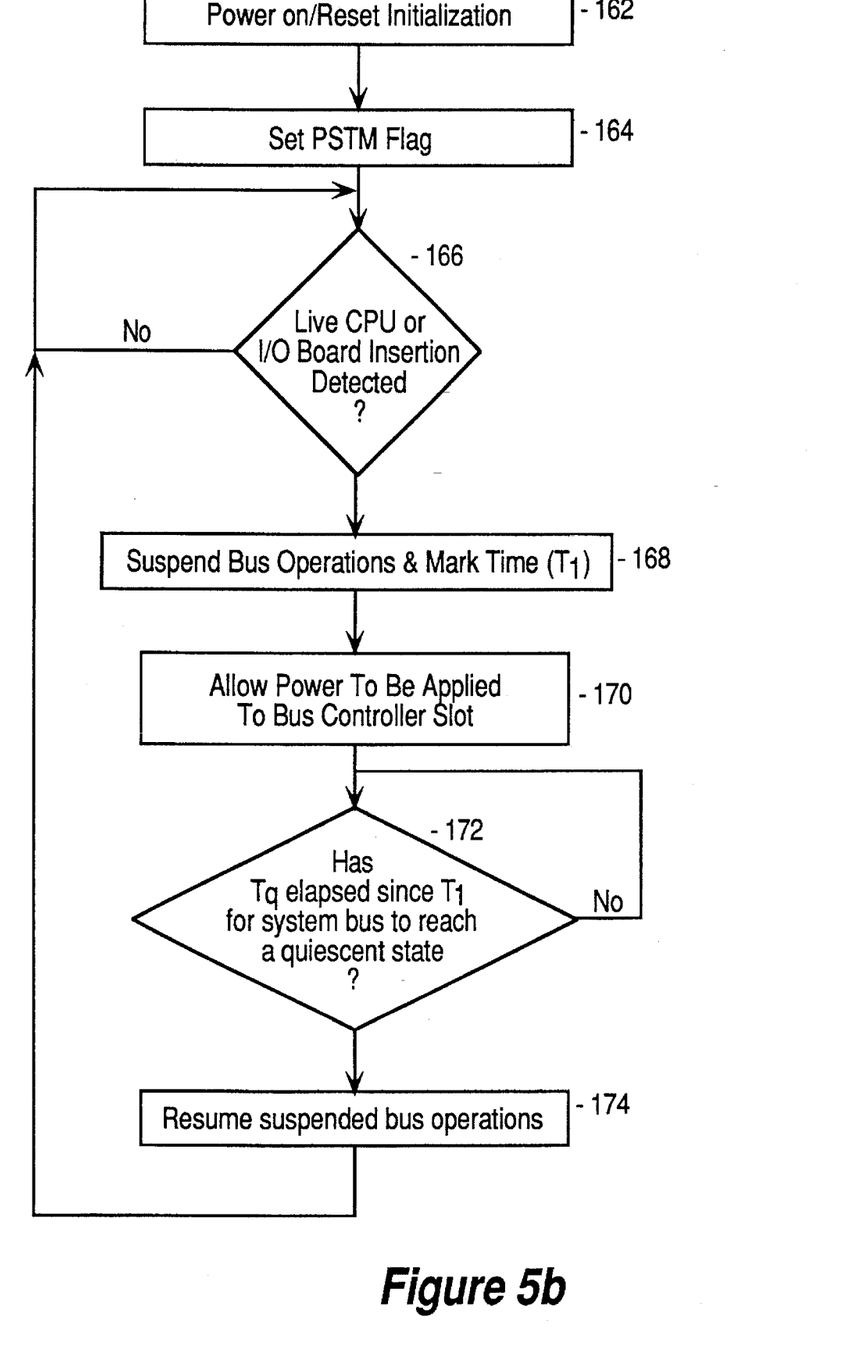
Figure 5C:
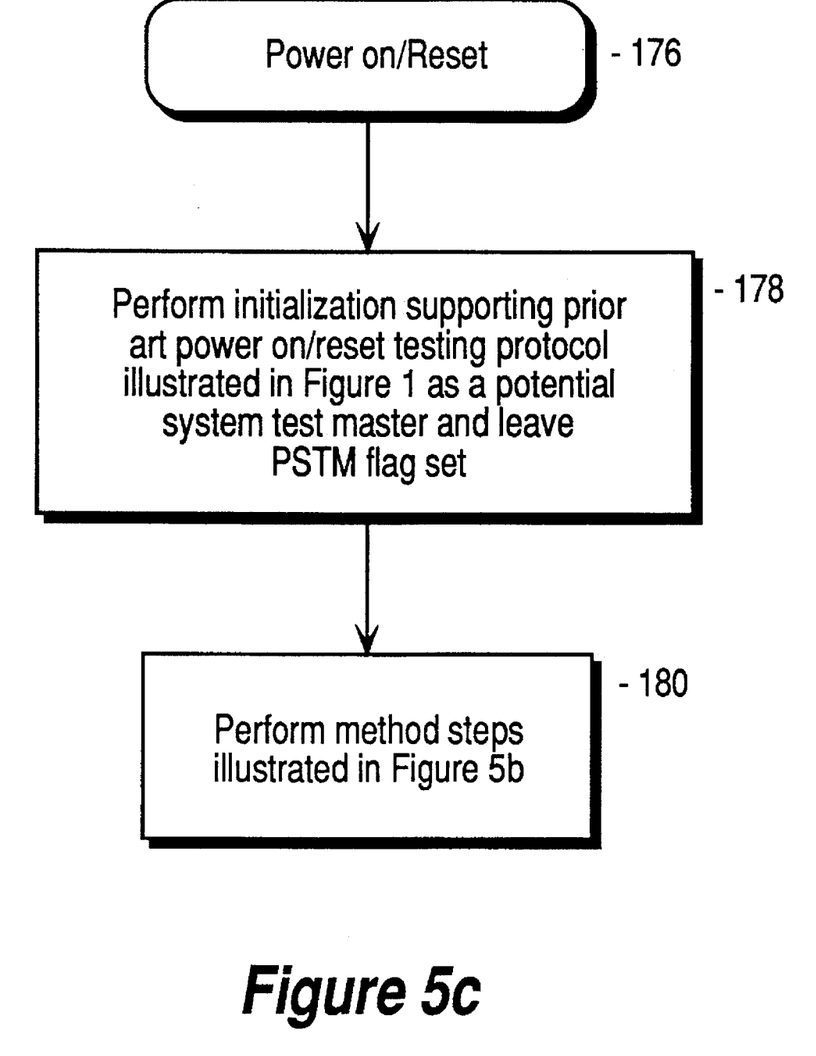

FIGS. 5*a*–5*c* illustrate three embodiments of the method steps of the present invention implemented by micro-controller 128, including the steps for ensuring the PSTM flag of bus control module 108 is in the set state, if and when a live inserted CPU or I/O board 104*a*–104* and 120*a*–120* arbitrates to be system test master. Under the first embodiment, as illustrated in FIG. 5*a*, during operation, micro-controller 128, using board detection circuitry 138, monitors for the detection of live insertion of a CPU or I/O board 104*a*–104* and 120*a*–120*, step 146. Upon detecting a live insertion of a CPU or I/O board 104*a*–104* and 120*a*–120*, micro-controller 128 suspends bus operations in progress and marks the time of suspension (T1), step 148. Then, micro-controller 128 sets the PSTM flag and marks the setting time (T2), step 150. Having suspended bus operation and set the PSTM flag, micro-controller 128 allows power to be applied to the live inserted CPU or I/O board 104*a*–104* and 120*a*–120*, step 152.

Next, micro-controller 128 waits and allows a sufficient amount of time ($T_q$) to elapse since T1 for the system bus 102 to reach a quiescent state, step 154. Micro-controller 128 then resumes the suspended bus operations, step 156. In one embodiment, $T_q$ is about 500 ms. Having resumed bus operations, micro-controller 128 ensures another sufficient amount of time ($T_a$) has elapsed since $T_2$ for the live inserted CPU or I/O board 104*a*–104* and 120*a*–120* to perform IST and to arbitrate to be system test master, step 158. When Ta has elapsed since $T_2$, micro-controller 128 clears the PSTM flag, step 160. Typically, elapse of Ta since $T_2$ occurs at a later point in time than the elapse of $T_q$ since T1. In one embodiment, Ta is about 10.5 seconds.

Note that although micro-controller 128 by design is guaranteed to win system test master arbitration, as described earlier, micro-controller 128 does not clear the IST complete flag of the live inserted CPU or I/O board 104*a*–104* and 120*a*–120*, giving it the impression that its participation in system wide testing is undesired by the winning system test master. Furthermore, micro-controller 128 does not initiate any system wide testing. As a result of the live inserted CPU or I/O board 104*a*–104* and 120*a*–120* being led to think "erroneously" that another board at a lower ordered connector slot wants to master the system wide test, it may continue to support the prior art power on/reset testing protocol without having to have any modifications to enable it to be "live insertable".

FIG. 5*b* illustrates a second embodiment of the method steps of the present invention implemented by micro-controller 128. The method steps of the present invention under the second embodiment are substantially the same as the first embodiment, except micro-controller 128 does not set and reset the PSTM flag responsive to the each detection of live inserted CPU or I/O board 104*a*–104* and 120*a*–120*. Instead, micro-controller 128 sets the PSTM flag, step 164 after power on/reset initialization, step 162, and leaves the PSTM flag in the set state during the entire time the system 100 is in operation. Thus, in like manner, each live inserted CPU or I/O board 104*a*–104* and 120*a*–120* who arbitrates to be system test master would be "misled" and yield to the bus control module 108. Accordingly, the live inserted CPU or I/O board 104*a*–104* and 120*a*–120* may continue to support the prior art power on/reset testing protocol without having to have any modifications to enable it to be "live insertable".

FIG. 5*c* illustrates a third embodiment of the method steps of the present invention implemented by micro-controller 128. The method steps of the present invention under the third embodiment are substantially the same as the second embodiment, except micro-controller 128 does not set the PSTM flag after initialization is complete. Instead, micro-controller 128 performs initialization in a manner that supports the prior art power on/reset testing protocol illustrated in FIG. 1 as a potential system test master, but leaves the PSTM flag in the set state, step 178. Thus, in like manner, each live inserted CPU or I/O board 104*a*–104* and 120*a*–120* who arbitrates to be system test master would also be "misled" and yield to the bus control module 108. Accordingly, the live inserted CPU or I/O board 104*a*–104* and 120*a*–120* may continue to support the prior art power on/reset testing protocol without having to have any modifications to enable it to be "live insertable".

Thus, a method and apparatus for managing live insertion of CPU or I/O boards has been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A bus control module comprising:

a data interface having a first flag, when set, denoting the bus control module as a potential system test master responsible for conducting system level testing to any CPU or I/O board arbitrating to be a system test master, the CPU or I/O board(s) being interconnected to a system bus through bus connector slot(s) of the system bus, wherein power application to the bus connector slot(s) and performance of bus operations on the system bus are both controlled by the bus control module; and a micro-controller coupled to the data interface for ensuring the first flag is in the set state if and when a live inserted CPU or I/O board arbitrates to be the system test master, thereby always injecting the bus control module in the system test master arbitration.

2. The bus control module as set forth in claim 1, wherein the bus connector slots are ordered, with the bus control module by convention occupying the lowest order bus connector bus slot;

the live inserted CPU or I/O board, upon being provided with power, performs a self test, and when completed, sets a second flag, accessible from the system bus, denoting the self test was completed;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag whenever a live insertion is detected, and clears the first flag after sufficient time has elapsed for system test master arbitration; and the micro-controller upon winning system test master arbitration by default neither clears the second flag of the live inserted CPU or I/O board, nor initiates/masters any system test.

3. The bus control module as set forth in claim 1, wherein the bus connector slots are ordered, with the bus control module by convention occupying the lowest order bus connector slot;

the live inserted CPU or I/O board, upon being provided with power, performs a self test, and when completed, sets a second flag, accessible from the system bus, denoting the self test was completed;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag after power on/reset initialization, and leaves the first flag in the set state for the entire time during operation; and the micro-controller upon winning system test master arbitration by default neither clears the second flag of the live inserted CPU or I/O board, nor initiates/masters any system test.

4. The bus control module as set forth in claim 1, wherein the bus connector slots are ordered, with the bus control module by convention occupying the lowest order bus connector slot;

the live inserted CPU or I/O board, upon being provided with power, performs a self test, and when completed, sets a second flag, accessible from the system bus, denoting the self test was completed;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag during power on/reset initialization to arbitrate to be system test master, and leaves the first flag in the set state for the entire time during operation; and the micro-controller upon winning system test master arbitration by default neither clears the second flag of the live inserted CPU or I/O board, nor initiates/masters any system test.

5. A computer system comprising:

a processor board having at least one processor for executing instructions;

a memory board having at least one memory module for storing data; and a system board having a system bus assembly against which the processor and memory boards are coupled, the system bus assembly further including a plurality of bus connector slots for removably coupling a corresponding plurality of CPU or I/O boards, and a bus control module having:

a data interface including a first flag, when set, denoting the bus control module as a potential system test master responsible for conducting system level testing to any CPU or I/O board arbitrating to be system test master, the CPU or I/O board(s) being interconnected to the system bus through the bus connector slot(s), wherein power application to the bus connector slots and performance of bus operations on the system bus are both controlled by the bus control module, and a micro-controller coupled to the data interface for ensuring the first flag is in the set state if and when a live inserted CPU or I/O board arbitrates to be system test master, thereby injecting the bus control module in the system test master arbitration.

6. The computer system as set forth in claim 5, wherein the bus connector slots are ordered with the bus control module by convention occupying the lowest order bus connector slot;

the live inserted CPU or I/O board, upon being provided with power, performs a self test, and if completed successfully, sets a second flag, accessible from the system bus, denoting the self test was completed successfully;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag whenever a live insertion is detected, and clears the first flag after sufficient time has elapsed to for system test master arbitration; and the micro-controller upon winning system test master arbitration by default neither clears the second flag of the live inserted CPU or I/O board, nor initiates/masters any system test.

7. The computer system as set forth in claim 5, wherein the bus connector slots are ordered, with the bus control module by convention occupying the lowest order bus connector slot;

the live inserted CPU or I/O board, upon being provided with power, performs a self test, and when completed, sets a second flag, accessible from the system bus, denoting the self test was completed;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag after power on/reset initialization, and leaves the first flag in the set state for the entire time during operation; and the micro-controller upon winning system test master arbitration by default neither clears the second flag of the live inserted CPU or I/O board, nor initiates/masters any system test.

8. The computer system as set forth in claim 5, wherein the bus connector slots are ordered, with the bus control module by convention occupying the lowest order Bus connector slot;

the live inserted CPU or I/O board, upon being provided with power, performs a self test, and when completed, sets a second flag, accessible from the system bus, denoting the self test was completed;

the live inserted CPU or I/O board, if eligible to be a system test master, further arbitrates to be system test master by iteratively checking for any potential system test master occupying a lower ordered bus connector slot, the live inserted CPU or I/O board giving up system test master arbitration whenever detecting a potential system test master at a lower ordered bus connector slot;

the micro-controller sets the first flag during power on/reset initialization to arbitrate to be system test master, and leaves the first flag in the set state for the entire time during operation; and the micro-controller upon winning system test master arbitration by default neither clears the second flag of the live inserted CPU or I/O board, nor initiates/masters any system test.

9. In a computer system comprising a system bus assembly including a system bus, a plurality of bus connector slots for removably coupling a corresponding plurality of CPU or I/O boards to the system bus, and a bus control module for controlling power application to the bus connector slots as well as performance of bus operations on the system bus, a method for managing live insertion of a CPU or I/O board into one of the bus connector slot, the method comprising the steps of:

a) the bus control module injecting itself into and winning each system test master arbitration resulted from a live insertion of a CPU or I/O board;

b) the bus control module leaving the live inserted CPU or I/O board to think its participation in system wide testing is undesired by the system test master; and c) the bus control module refraining from initiating and mastering any system test notwithstanding its winning of system test master arbitration.

10. The method as set forth in claim 9, wherein, the bus connector slots being ordered, with the bus control module by convention occupying the lowest order bus connector bus slot;

said method further comprises the steps of:

d) the live inserted CPU or I/O board, upon being provided with power, performing a self test, and when completed, setting a second flag, accessible from the system bus, denoting the self test was completed, and e) the live inserted CPU or I/O board, if eligible to be a system test master, further arbitrating to be the system test master by iteratively checking for any potential system test master occupying a lower ordered bus connector slot, and the live inserted CPU or I/O board giving up system test master arbitration whenever detecting a potential system test master at a lower ordered bus connector slot;

said step (a) comprises the steps of:

a.1) the bus control module monitoring for live insertion of a CPU or I/O board into one of the bus connector slots, a.2) the bus control module, responsive to a detection, setting a first flag to denote to the live inserted CPU or I/O board that the bus control module is a potential system test master before allowing power to be applied to the bus connector slot against which the CPU or I/O board is live inserted, and a.3) the bus control module resetting the first flag when system test master arbitration is completed.

11. The method as set forth in claim 9, wherein, the bus connector slots being ordered, with the bus control module by convention occupying the lowest order bus connector bus slot;

said method further comprises the steps of:

d) the live inserted CPU or I/O board, upon being provided with power, performing a self test, and when completed, setting a second flag, accessible from the system bus, denoting the self test was completed, and e) the live inserted CPU or I/O board, if eligible to be a system test master, further arbitrating to be the system test master by iteratively checking for any potential system test master occupying a lower ordered bus connector slot, and the live inserted CPU or I/O board giving up system test master arbitration whenever detecting a potential system test master at a lower ordered bus connector slot;

said step (a) comprises the bus control module setting the first flag after power on/reset initialization, and leaving the first flag in the set state for the entire time during operation.

12. The method as set forth in claim 9, wherein, the bus connector slots being ordered, with the bus control module by convention occupying the lowest order bus connector bus slot;

said method further comprises the steps of:

d) the live inserted CPU or I/O board, upon being provided with power, performing a self test, and when completed, setting a second flag, accessible from the system bus, denoting the self test was completed, and e) the live inserted CPU or I/O board, if eligible to be a system test master, further arbitrating to be the system test master by iteratively checking for any potential system test master occupying a lower ordered bus connector slot, and the live inserted CPU or I/O board giving up system test master arbitration whenever detecting a potential system test master at a lower ordered bus connector slot;

said step (a) comprises the bus control module setting the first flag during power on/reset initialization to arbitrate to be system test master, and leaving the first flag in the set state for the entire time during operation.

* * * * *

UNITED STATES PATENT AND TRADEMARK OFFICE
CERTIFICATE OF CORRECTION

| | | |
|---|---|---|
| PATENT NO. | : | 5,581,712 |
| DATED | : | December 3, 1996 |
| INVENTOR(S) | : | Christopher D. Herrman |

It is certified that error appears in the above-identified patent and that said Letters Patent is hereby corrected as shown below:

In column 4 at line 15 delete "slot" and insert --slots--

In column 6 at line 50 delete "slot(s)" and insert --slots--

Signed and Sealed this

Fourth Day of March, 1997

Attest:

BRUCE LEHMAN

Attesting Officer

Commissioner of Patents and Trademarks